United States Patent
Chiang

(10) Patent No.: US 6,266,164 B1
(45) Date of Patent: Jul. 24, 2001

(54) SCANNING DEVICE HAVING TWO PARALLEL WHEEL SETS FOR MAINTAINING SCANNING DIRECTION

(75) Inventor: Te Ming Chiang, Taipei (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/013,815

(22) Filed: Jan. 27, 1998

(30) Foreign Application Priority Data

Oct. 9, 1997 (TW) ................................................ 86217196

(51) Int. Cl.⁷ ...................................................... H04N 1/04
(52) U.S. Cl. ............................................ 358/497; 358/474
(58) Field of Search .................................... 358/497, 494, 358/474, 400, 487, 471; 250/234, 208.1; 399/211; 355/75; 382/312

(56) References Cited

U.S. PATENT DOCUMENTS

| | | | |
|---|---|---|---|
| 4,870,502 | * 9/1989 | Dreinhoff et al. | 358/474 |
| 5,113,268 | * 5/1992 | Yoshida et al. | 358/474 |
| 5,239,392 | * 8/1993 | Suzuki et al. | 358/474 |
| 5,299,033 | * 3/1994 | Watanabe et al. | 358/497 |
| 5,734,483 | * 3/1998 | Itoh | 358/496 |
| 5,857,133 | * 1/1999 | Sun | 399/211 |

* cited by examiner

Primary Examiner—Cheukfan Lee
(74) Attorney, Agent, or Firm—Winston Hsu

(57) ABSTRACT

The present invention discloses a scanning device using two parallel wheel sets to maintain scanning direction of its scanning module. The scanning device comprises a housing, a scanning module and a driving device. The housing comprises a transparent platform set in its top for placing a document, and two parallel tracks installed along left and right directions inside the housing under the transparent platform. The driving device is installed inside the housing for driving the scanning module along the two parallel tracks to scan the document. The scanning module is slidably mounted on the two parallel tracks for scanning the document. It comprises an elongated image sensor having two ends, and two wheel sets installed under the two ends of the image sensor separately for engaging the two parallel tracks. Each wheel set comprises two roller wheels for supporting the image sensor upward and maintaining scanning direction and balance of the image sensor to prevent it from wobbling when sliding along the two parallel tracks.

4 Claims, 4 Drawing Sheets

SCANNING DEVICE HAVING TWO PARALLEL WHEEL SETS FOR MAINTAINING SCANNING DIRECTION

BACKGROUND OF THE INVENTION

1. Field of the Invention

The present invention relates to an image scanning device, and more particularly, to an image scanning device having two parallel wheel sets for maintaining scanning direction.

2. Description of the Prior Art

Please refer to FIG. 1 and FIG. 2. FIG. 1 is a top sectional view of a prior art flatbed scanning device 10. FIG. 2 is a sectional view taken along line 2—2 of the scanning device 10. The scanning device 10 comprises a housing 11, a scanning module 20, and a driving device which comprises steel strips 16. The housing 11 comprises a transparent platform 12 on its top for placing a document to be scanned, and two parallel tracks 14 installed along left and right directions below the transparent platform 12. The scanning module 20 is slidably mounted on the parallel tracks 14. It comprises a plastic chassis 28, an elongated image sensor 18 mounted inside the chassis 28 for scanning the document, and two wheel sets 21 installed under two ends of the chassis 28 for engaging the parallel tracks 14 and supporting the chassis 28 upward. Each wheel set 21 comprises a roller wheel 22 installed on its lower end for rotatably engaging one track 14, and a spring (not shown) inside for elastically pushing the chassis 28 upward against the transparent platform 12. The steel strips 16 of the driving device are mounted on two ends of the chassis 28 for pulling the scanning module 20 along the two parallel tracks 14 of the transparent platform 12. The wiring structure of the steel strips 16 is quite complex and is only partially shown on FIG. 1.

Since each wheel set 21 of the scanning module 20 has only one roller wheel 22, it can neither properly maintain the sliding direction of the scanning module 20 nor can it keep the balance of the scanning module 20 on the tracks 14 when scanning a document. The sliding direction and balance of the scanning module 20 are completely maintained by the wiring structure of the steel strips 16. However, the wiring structure of the steel strips 16 is very complex and it is very time consuming to install or adjust the wiring structure of the steel strips 16.

SUMMARY OF THE INVENTION

It is therefore a primary objective of the present invention to provide a scanning device which comprises two parallel wheel sets for maintaining scanning direction and balance of its scanning module so that its driving device can be simplified.

In a preferred embodiment, the present invention provides a scanning device comprising:

a housing having a transparent platform set in its top for placing a document, and two parallel tracks installed along left and right directions inside the housing under the transparent platform;

a scanning module slidably mounted on the two parallel tracks for scanning the document, the scanning module comprising:

an elongated image sensor having two ends, and two wheel sets installed under the two ends of the image sensor separately for engaging the two parallel tracks wherein each wheel set comprises two roller wheels for supporting the image sensor upward and maintaining scanning direction and balance of the image sensor to prevent it from wobbling when sliding along the two parallel tracks; and a driving device installed inside the housing for driving the scanning module along the two parallel tracks to scan the document.

It is an advantage of the present invention that each of the two wheel sets comprises two roller wheels for maintaining the scanning direction and balance of the image sensor so that the driving device can be greatly simplified.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 3:
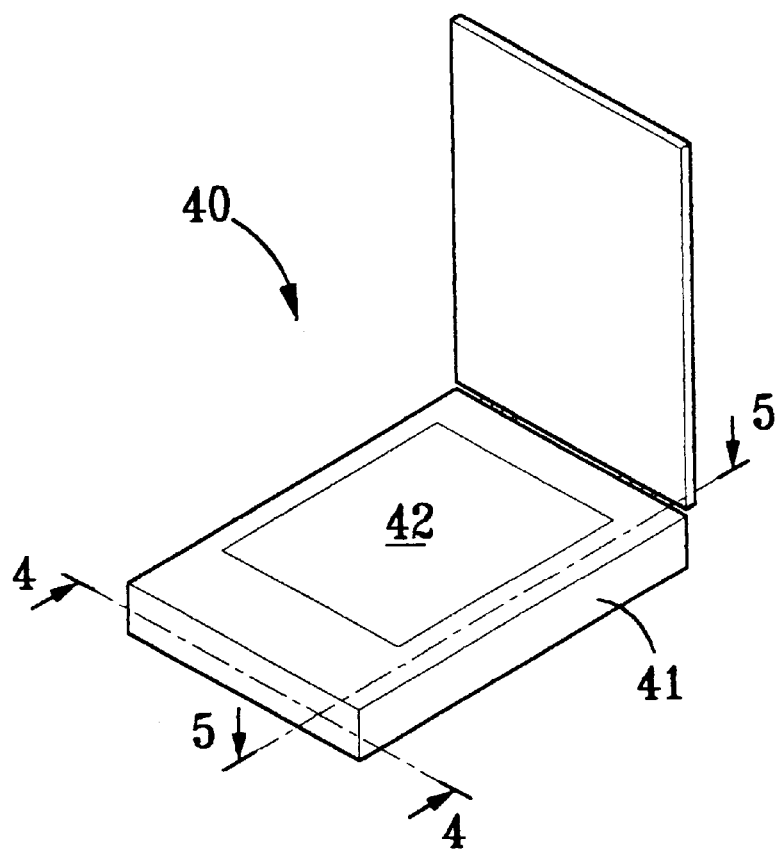
FIG. 3 is a perspective view of a scanning device according to the present invention.
Figure 4:
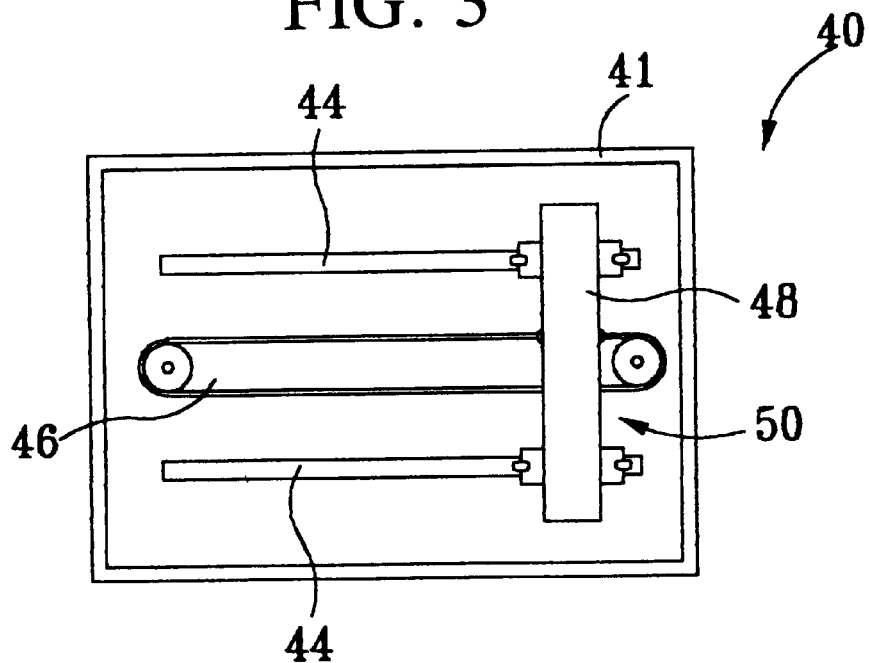
FIG. 4 is a top sectional view taken along line 4—4 of the scanning device shown in FIG. 3.
Figure 5:
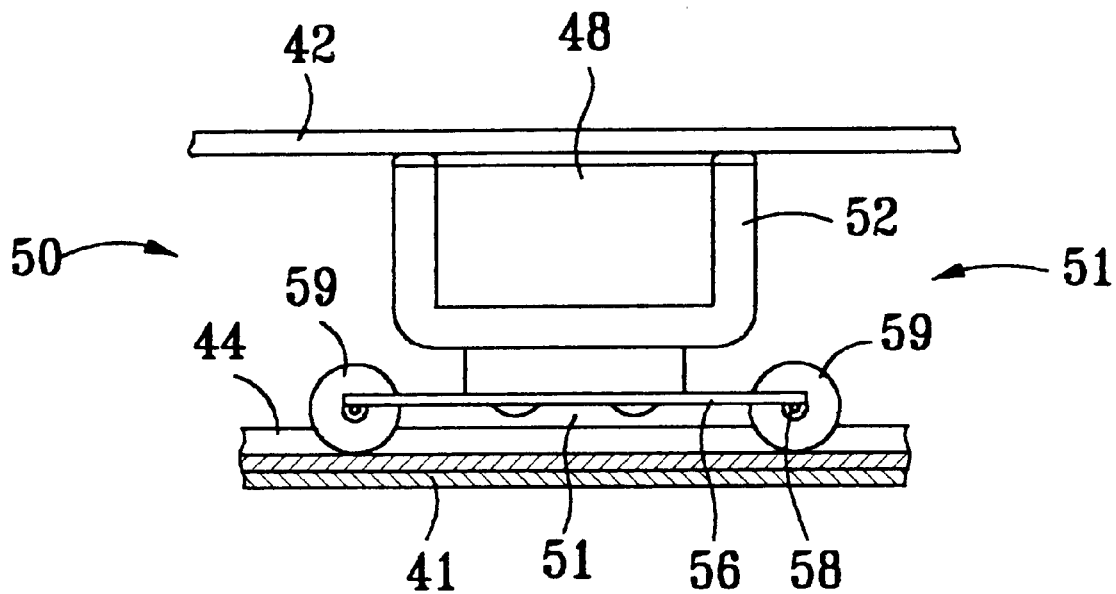
FIG. 5 is a side sectional view taken along line 5—5 of the scanning device shown in FIG. 3.

Please refer to FIGS. 3–5. FIG. 3 is a perspective view of a flatbed scanning device 40 according to the present invention. FIG. 4 is a top sectional view taken along line 4—4 of the scanning device 40. FIG. 5 is a side sectional view taken along line 5—5 of the scanning device 40. The scanning device 40 comprises a housing 41, a scanning module 50, and a driving device 46. The housing 41 comprises a transparent platform 42 set in its top for placing a document, and two parallel tracks 44 installed along left and right directions below the transparent platform 42 inside the housing 41. The scanning module 50 is slidably mounted on the parallel tracks 44. It comprises a chassis 52, an elongated image sensor 48 mounted inside the chassis 52, and two wheel sets 52 installed under two ends of the chassis 51 and engaged with the two parallel tracks 44. Each wheel set 51 comprises a stainless steel pad 56 mounted under the chassis 52, and two roller wheels 59 rotatably mounted at two ends of the stainless steel pad 56. The scanning module 50 is elastically pushed upward against the transparent platform 42 by the steel pad 56. And the scanning direction and balance of the scanning module 50 along the two parallel tracks 44 are maintained by the two roller wheels 59.

The driving device 46 is installed between the two parallel tracks 44. It comprises two wheels rotatably mounted at left and right ends inside the housing 41, a circular belt mounted on the two wheels and connected to the middle portion of the scanning module 50, and a stepping motor (not shown) for driving one of the two wheels to move the scanning module 50 along the two parallel tracks 44.

Figure 1:
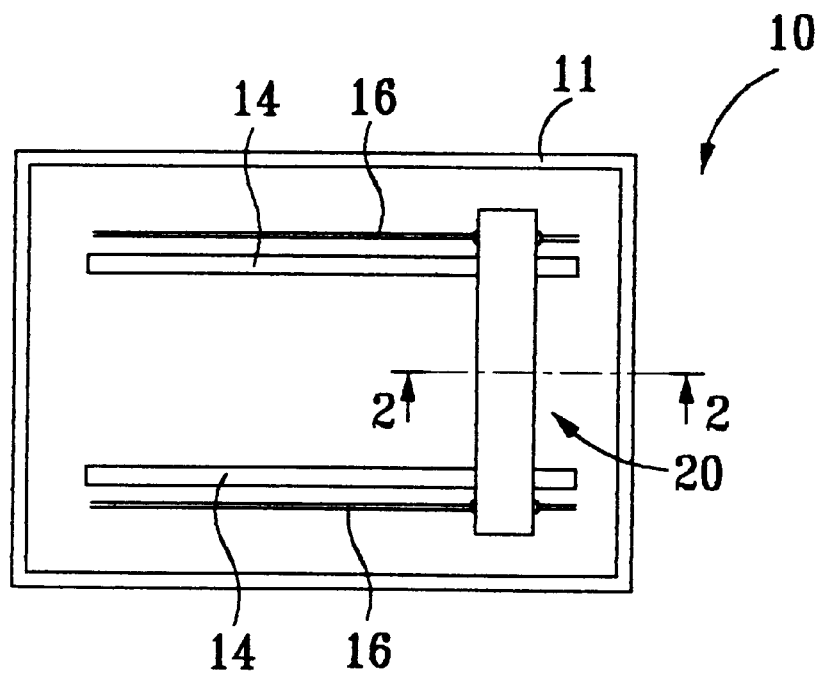
FIG. 1 is a top sectional view of a prior art flatbed scanning device.
Figure 2:
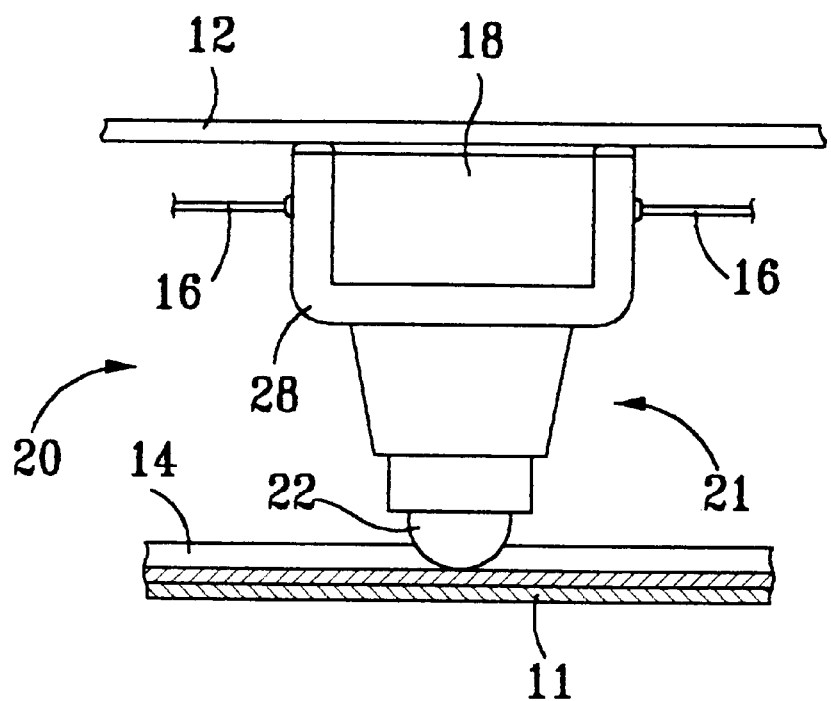
FIG. 2 is a sectional view taken along line 2—2 of the scanning device shown in FIG. 1.

Since the two roller wheels 59 of each wheel set 51 are linearly arranged along each track 44, the scanning direction and balance of the scanning module 50 can thus be maintained by the two wheel sets 51 to prevent it from wobbling when scanning a document along the two parallel tracks 44. The driving device of the scanning module 50 is no longer needed to maintain the scanning direction and balance of the scanning module 50 and thus can be greatly simplified. In the present embodiment, the structure of the driving device 46 is much simpler than the wiring structure of driving device 16 as disclosed in FIG. 1.

Figure 6:
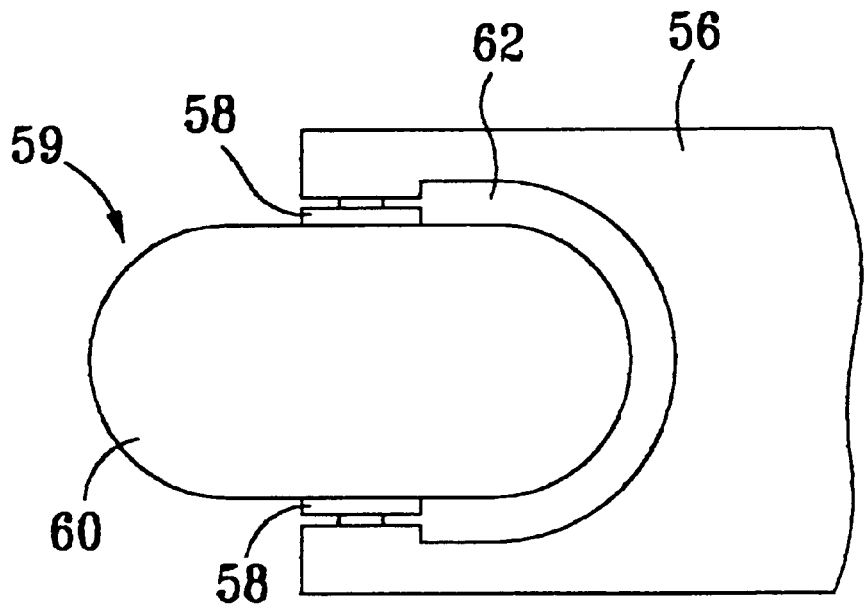
FIG. 6 is a top view of the roller wheel shown in FIG. 5.
Figure 7:
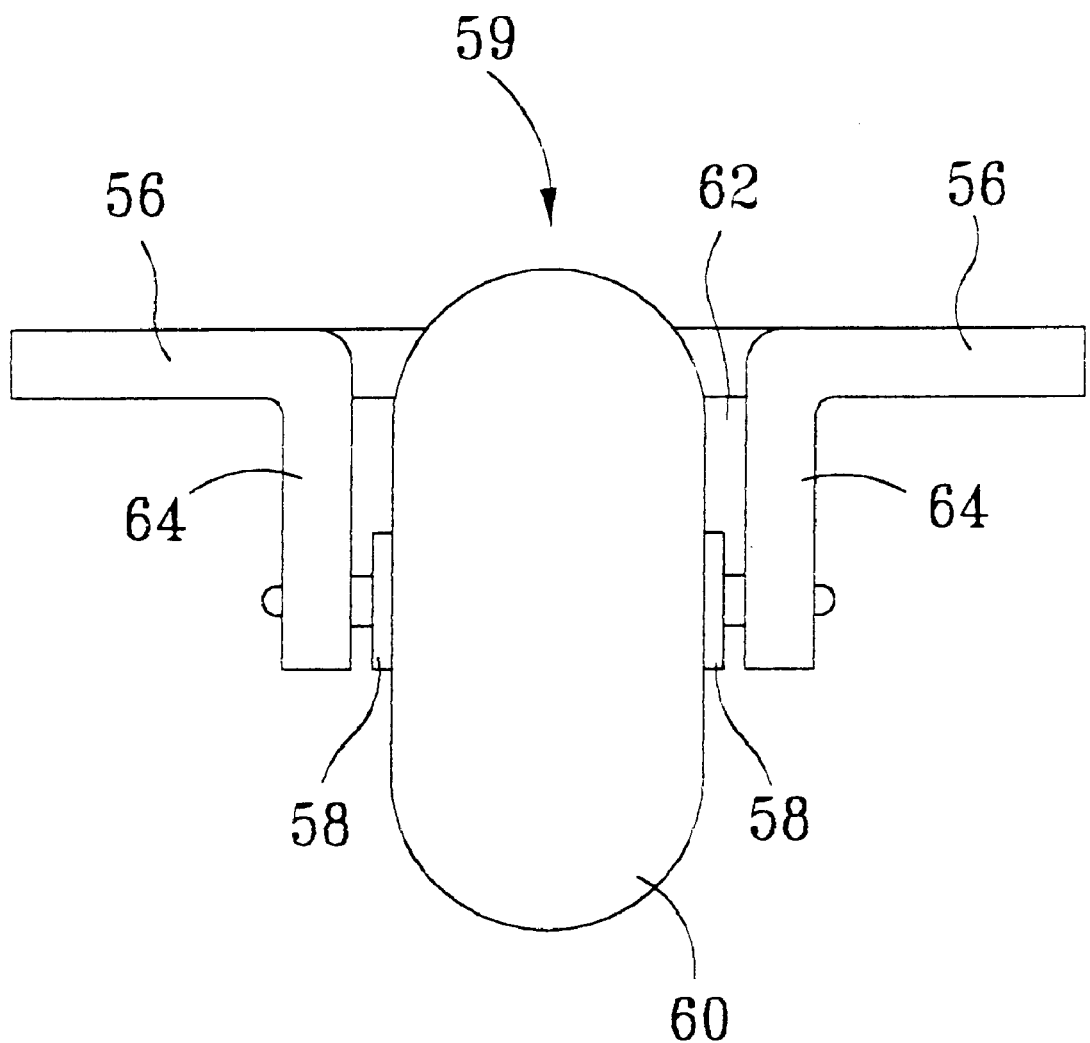
FIG. 7 is a front view of the roller wheel shown in FIG. 5.

Please refer to FIG. 6 and FIG. 7. FIG. 6 is a top view of one roller wheel 59 shown in FIG. 5. FIG. 7 is a front view of the roller wheel 59 shown in FIG. 5. The roller wheel 59 comprises a metal axle 58, and a plastic wheel body 60 covering around the metal axle 58. Each end of the stainless steel pad 56 comprises a half-moon-shaped recess 62, and two L-shaped corners 64 for holding the roller wheel 59. The design of the two L-shaped corners 64 makes it very easy to install the roller wheel 59 from the upper side of the recess 62, and the cost of the steel pad 56 is very cheap.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanning device comprising:

a housing having a transparent platform set in its top for placing a document, and two parallel tracks installed along left and right directions inside the housing under the transparent platform;

a scanning module slidably mounted on the two parallel tracks for scanning the document, the scanning module comprising:

an elongated image sensor having two ends, and two wheel sets installed under the two ends of the image sensor separately for engaging the two parallel tracks wherein each wheel set comprises two roller wheels for maintaining scanning direction and balance of the image sensor and an elastic pad for mounting the two roller wheels on its two ends and also for elastically supporting the image sensor upward against the transparent platform; and a driving device installed inside the housing for driving the scanning module along the two parallel tracks to scan the document.

2. The scanning device of claim 1 wherein the elastic pad is a stainless steel pad.

3. The scanning device of claim 1 wherein the driving device is installed between the two parallel tracks and connected to a middle portion of the scanning module for driving the scanning module along the two parallel tracks.

4. The scanning device of claim 3 wherein the driving device comprises two wheels rotatably mounted at left and right ends inside the housing and a circular belt mounted on the two wheels and connected to a middle portion of the scanning module for driving the scanning module along the two parallel tracks.

* * * * *